US005592172A

United States Patent [19]

Bailey et al.

[11] Patent Number: 5,592,172

[45] Date of Patent: Jan. 7, 1997

[54] METHOD OF, AND SYSTEM FOR, DESCRIBING A GEOGRAPHICAL AREA TO A COMMUNICATIONS NETWORK

[75] Inventors: Alister J. Bailey, Cambridge, England; Ruud H. M. Hendricksen, Beek en Donk, Netherlands

[73] Assignee: U.S. Philips Corporation, New York, N.Y.

[21] Appl. No.: 226,617

[22] Filed: Apr. 12, 1994

[30] Foreign Application Priority Data

May 14, 1993 [GB] United Kingdom .................... 9309916

[51] Int. Cl.[6] ........................................ G01S 1/00

[52] U.S. Cl. ........................ 342/350; 340/993; 340/910

[58] Field of Search ................................ 340/993, 988, 340/910; 364/449; 342/350, 457

[56] References Cited

U.S. PATENT DOCUMENTS 4,644,351 2/1987 Zabarsky et al. .................. 340/825.44
5,182,555 1/1993 Summer .................................. 340/905
5,206,641 4/1993 Grant et al. ............................. 340/905
5,214,793 5/1993 Conway et al. ........................ 455/49.1
5,218,629 6/1993 Dumond et al. .......................... 379/59

*Primary Examiner*—Thomas H. Tarcza
*Assistant Examiner*—Dao L. Phan
*Attorney, Agent, or Firm*—Arthur G. Schaier

[57] ABSTRACT

Traffic information is gathered by traffic centres (TC) and quite frequently it is desired to alert drivers to the presence of a hazard which can be avoided if an early warning can be given. However as most hazards are of local interest then in order to avoid transmitting the early warning nationally, a system is used to transmit the early warning to suitably equipped vehicles using the digital cellular radio network. In view of the fact that the location of the network's base stations (BS1 to 3, BS20 and BS21) and their contemporaneous coverage areas may be unknown to the traffic centres it is necessary for the traffic centres to relay a description of the geographical area over which an early warning should be given to the control computer (C) of the cellular network so that the control computer can decide which of the base stations provide a combined coverage area most closely matching the description of the geographical area and activate the transmitters of the selected base stations.

24 Claims, 8 Drawing Sheets

| | | | | | | | | | |
|---|---|---|---|---|---|---|---|---|---|
| 1 | 0 | 1 | α1 | | 0 | 1 | 1 | β1 | |

| | | | | | |
|---|---|---|---|---|---|
| 1 | x | α2-α1 | x | x | β2-β1 |
| 1 | x | α3-α2 | x | x | β3-β2 |
| 1 | x | α4-α3 | x | x | β4-β3 |
| 1 | x | α5-α4 | x | x | β5-β4 |
| 1 | x | α6-α5 | x | x | β6-β5 |
| 1 | x | α7-α6 | x | x | β7-β6 |
| 0 | x | α8-α7 | x | x | β8-β7 |

METHOD OF, AND SYSTEM FOR, DESCRIBING A GEOGRAPHICAL AREA TO A COMMUNICATIONS NETWORK

BACKGROUND OF THE INVENTION

The present invention relates to a method of, and system for, describing a geographical area to a communications network in order to restrict the transmission of data to that area. The present invention has particular, but not exclusive, application for relaying traffic information to vehicles in a predetermined geographical areas.

In many countries there already exist information centres which gather and retain information about road traffic flow behaviour for example that traffic is flowing freely through a junction, that traffic lights have failed causing a traffic jam and that there has been an accident and traffic has been held up. Such information is regularly broadcast over public radio systems so that anyone having a suitably tuned receiver hears the information irrespective of whether they have any interest in it.

Road traffic information and vehicle navigation systems are currently under development in different countries of the world. A European wide project called SOCRATES envisages communicating information to a computer carried in a vehicle by radio using the GSM digital cellular telephone network. As the information to be transmitted may be relevant to a relatively small geographical area only it is pointless for an entire network to broadcast such information nationwide.

Although the locations of most cellular telephone or cellular radio base stations are fixed, operators frequently want to keep such information confidential. Additionally depending on the current level of telephone or radio traffic through a base station and/or the serviceability of the base station, the network operator may want to reconfigure his network by altering the size and/or shape of the coverage area of one or more base stations for example by varying the transmitter output power and/or modifying the antenna arrangement to make transmissions directional rather than omnidirectional. In view of this a traffic centre which is operated independently of a cellular telephone or radio network cannot for example instruct a cellular network operator which particular base stations of the network should carry traffic information relating to an incident.

SUMMARY OF THE INVENTION

According to one aspect of the present invention there is provided a method of describing a geographical area to a communications network, comprising determining the shape of the geographical area and the location of at least one point lying symmetrically in the geographical area or on the perimeter of the area, encoding the location of the at least one point as an angle of latitude and an angle of longitude and encoding the shape of the geographical area as a series of bits, and transmitting the description of the geographical area as a single code word or a plurality of concatenated code words.

According to another aspect of the present invention there is provided a method of relaying road traffic information to vehicles in a predetermined geographical area, comprising determining the size and shape of the geographical area in which vehicles should receive a particular item of road traffic information, encoding details of the geographical area as angles of latitude and longitude of at least one point lying symmetrically in or on the perimeter of the area and as an indication of its shape, transmitting said encoded details as a single code word or concatenated code words to a control computer of a cellular radio network comprising a plurality of geographically distributed radio transmitters, determining from the received encoded details which of the radio transmitters will provide a coverage area most closely matching the geographical area and activating those radio transmitters to relay the item of road traffic information.

According to a further aspect of the present invention there is provided a system for relaying road traffic information to vehicles in a predetermined geographical area in which radio transmitters of a cellular network are located, comprising means for determining the size and shape of the geographical area, means for encoding a description of the geographical area as the angles of latitude and longitude of at least one point lying symmetrically in or on the perimeter of the area and as an indication of its shape, means for relaying the description to a cellular radio network, the cellular radio network having means for storing the locations and contemporaneous coverage areas of all the transmitters in the network, means for determining from the received description which of the transmitters can collectively provide a coverage area most closely matching the geographical area described and means for generating road traffic information and for activating the relevant transmitters.

The manner of encoding details of the shape of a geographical area depend on whether it is symmetrical such as a square or circle or another shape such as a rectangle, polygon or a corridor comprising a series of interconnected squares.

In the case of a geographical area requiring n points to describe it, where n is an integer greater than 1, the description may comprise the angles of latitude and longitude of each point. Alternatively the angles of latitude and longitude of one of n points may be given together with the angular changes between the one of the n points and the next following point, and, if required, between the next following point and a further point, and so on.

BRIEF DESCRIPTION OF THE DRAWINGS

The present invention will now be described, by way of example, with reference to the accompanying drawings, wherein.

In the drawings the same reference numerals have been used to indicate corresponding features.

DESCRIPTION OF THE PREFERRED EMBODIMENT

Figure 1:
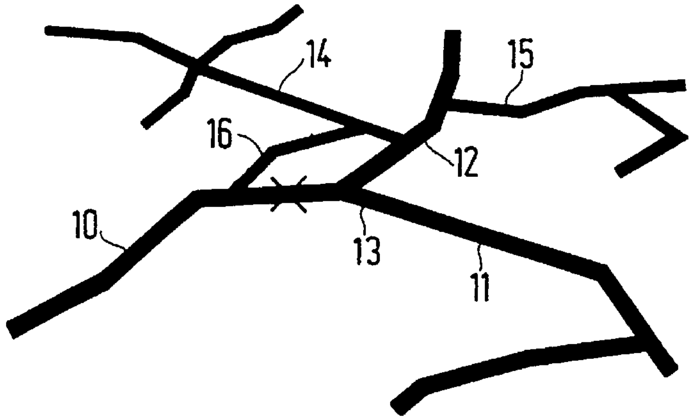
FIG. 1 is a map showing several roads.

The map shown in FIG. 1 shows three major roads 10,11,12 meeting at a junction 13 together with minor roads 14,15 which lead-off from the major road 12 and another minor road 16 which links the roads 10 and 14.

Figure 3:
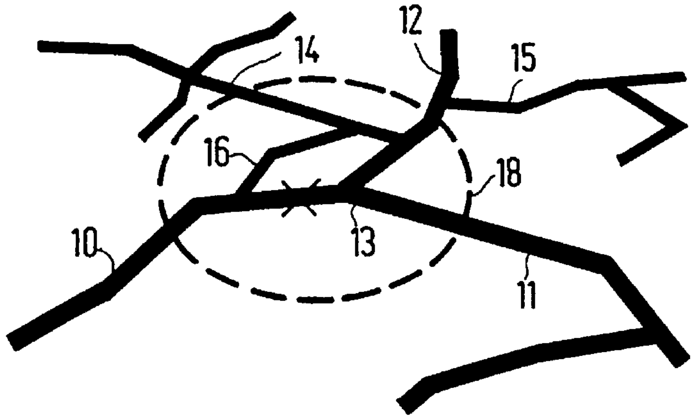
FIG. 3 is the map of FIG. 1 showing an encircled geographical area in which it is desired that vehicles be informed of the occurrence of a traffic incident.

If it is assumed that an accident has occurred on the road 10 at a point marked X, the subsequent build-up in the number of vehicles on either side of the point X would cause undue delay to drivers. However if the vehicles entering the local area, shown encircled by the circle 18 in FIG. 3, could be informed of the accident at the point X, then diverting the traffic around the accident site by making use of the minor roads 14 and 16, the delays to traffic can be reduced.

Figure 2:
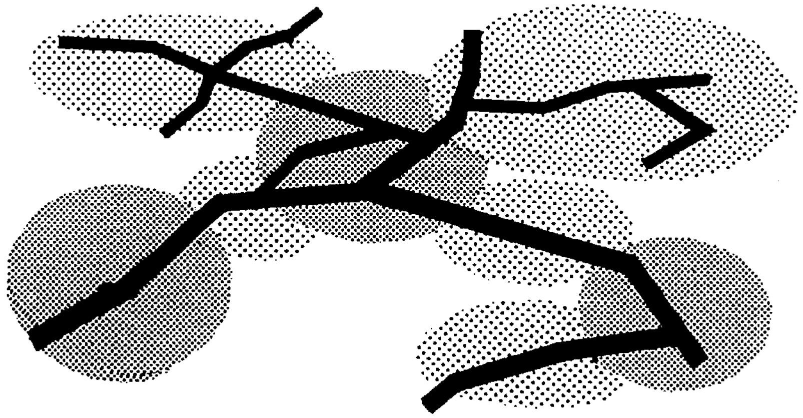
FIG. 2 is the map of FIG. 1 showing the coverage areas of several base stations (or radio cells) of a cellular radio network.
Figure 4:
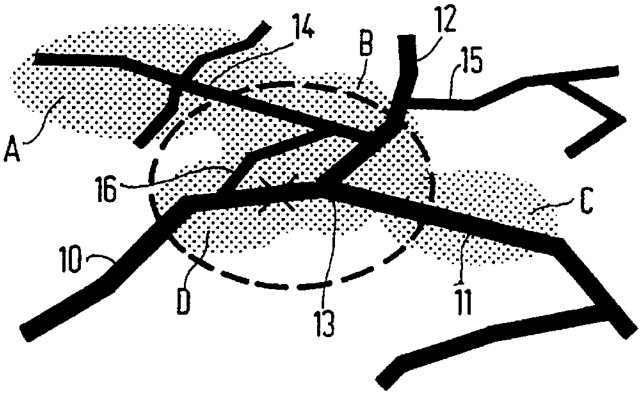
FIG. 4 shows the encircled area overlaid on the map shown in FIG. 2.

It will be assumed that communication with vehicles will be by radio using geographically spaced apart transmitters and in FIG. 2 the hatched circles represent the coverage areas (or radio cells) of transmitters in a cellular radio telephone network. However the location of the transmitters (or radio cells) is known only to the network operator who for operational reasons may reconfigure the network in the manner referred to in the preamble of this specification. In order to be able to determine which cells are to be used to notify vehicles in the encircled area (FIG. 3) of the accident at X (FIG. 1), the circle 18 is overlaid on the map shown in FIG. 2 and the result is that the cells A to D (FIG. 4) fall at least partially within the circle 18. Comparing FIGS. 2 and 4 it will be noted that some cells partially overlap the cells A to D but the degree of overlap is sufficiently insignificant that the cell concerned can be ignored or that the cells within the circle 18 provide adequate coverage having regard to the road network itself and the loading on the cellular radio network.

Access to the or each cellular network is by way of gateways and information about a geographical area can be sent to the or each gateway by a traffic centre in a packet format.

Figure 5:
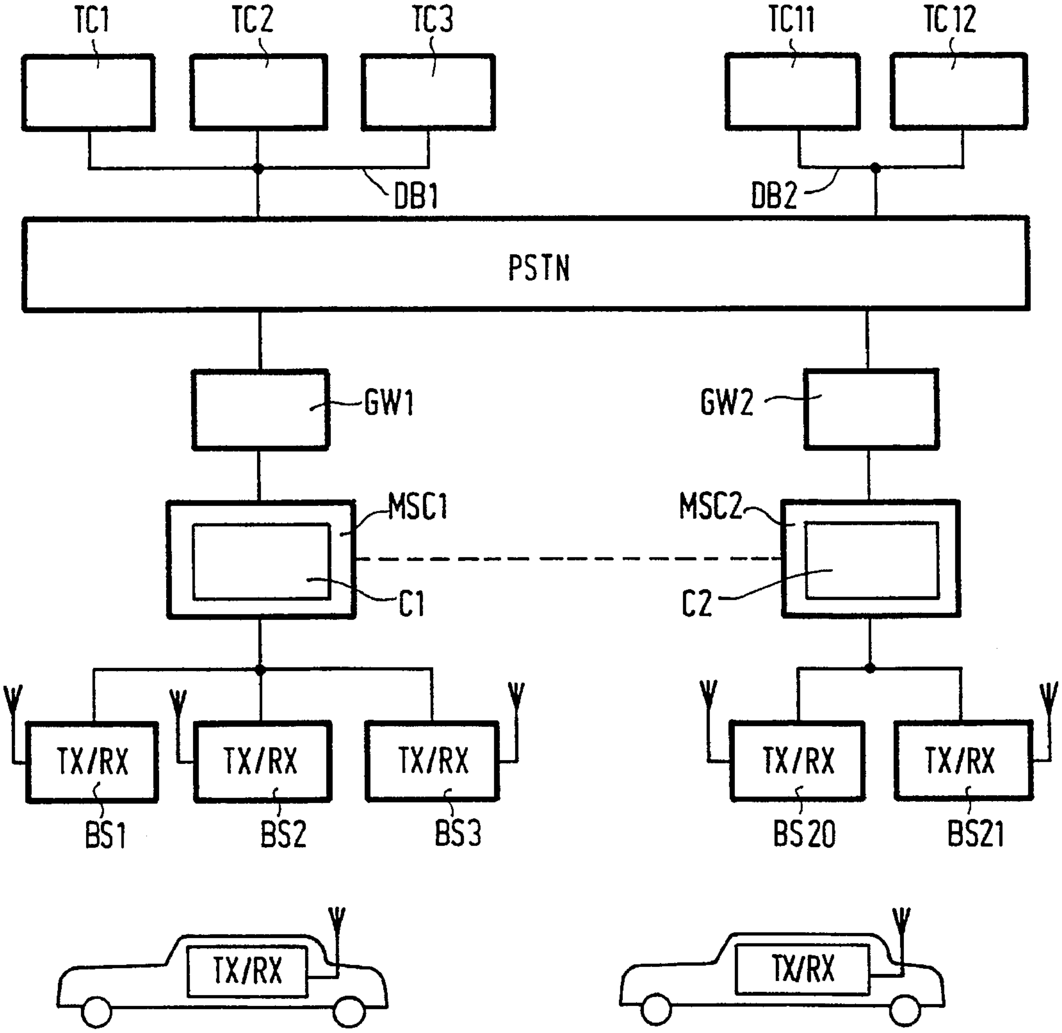
FIG. 5 is a diagram showing traffic centres connected to gateways of a number of cellular radio networks.

FIG. 5 illustrates a number of regional, district and/or urban traffic centres TC1 to TC3 and TC11,TC12 arranged in respective groups, the traffic centres in each group being interconnected by respective data busses DB1,DB2. By means of the PSTN the data busses DB1,DB2 are interconnected to form a network and gateways GW1 and GW2 of respective cellular radio networks, for example cellular telephone networks, are connected to the network so formed. Each gateway GW1,GW2 communicates with a respective mobile switching centre MSC1, MSC2 which includes a network control computer C1,C2 which stores the location of the base station radio transceivers BS1 to BS3, BS20 and BS21 in its cellular network and the present configuration of its network. Each network control computer C1,C2 handles all the call processing on its network. Also from the encoded geographical area information provided by one or more of the traffic centres, the network control computer or the gateway is able to generate numerically the shape and size of the geographical area concerned and decide which cells or transmitter coverage areas should be activated to relay the required traffic information.

In order to relay geographical area information efficiently, an embodiment of the method in accordance with the present invention encodes the geographical areas in a manner which can make use of the 32 bit address length found in the widely used Internet Protocol (IP). In order to do this it is necessary to combine a longitude angle, a latitude angle and an area shape into one address which is compatible with the standard address length found in the IP. The coding scheme can be extended to describe more complicated geographical area shapes by concatenating several geographical address code words of a type to be described.

A translation from this coding scheme to cellular telephone coverage areas may be carried at a suitable stage such as at the gateway of the cellular telephone network or in the network control computer. The network control computer will then be responsible for routing a packet to as many cells as necessary to achieve the desired coverage. As this is a form of routing, it will appear in a routing options list in an internetwork-layer header. In order to distinguish easily between ordinary computer addresses and these area descriptions, the area descriptions can exclusively use a different address type, in this instance class D addresses which under IP are defined for multicast and experimental use. Under IP an address class is defined by the location of the first zero in the address code word reading from left to right. Thus a 32 bit class D code word has the format:

| 1110 plus 28 following bits |
|---|

Figure 6:
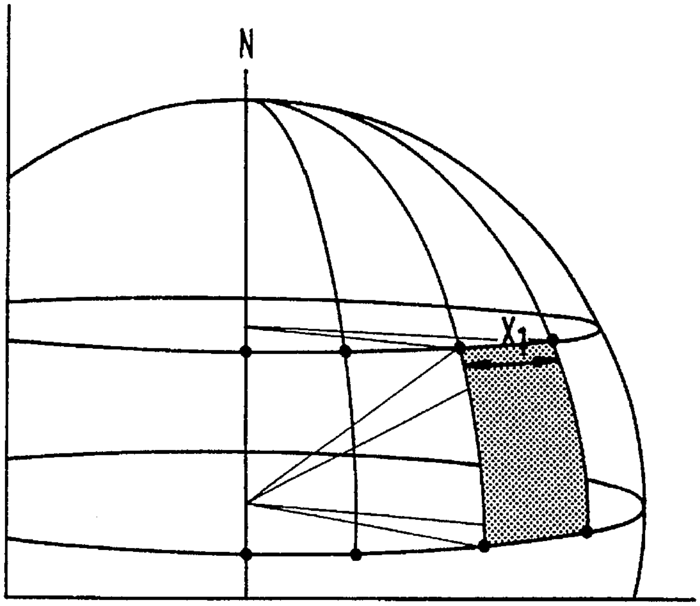
FIG. 6 is a diagram for defining a geographical area using internationally recognised datum points.

The remaining 28 bits have to be used for describing the shape and location of a geographical area. In the presently described embodiment, a point on the Earth's surface will be defined by a pair of angles from the Earth's centre (see FIG. 6) using internationally recognised datum points—the zero line goes through the intersection of the Greenwich meridian and the Equator. The resolution required to define a point is limited by the size of the coverage areas of the respective transmitters of a cellular telephone network. Additionally because of the lack of inhabited landmasses beyond the 70 degree north and south parallels, in most cases these extreme areas can be ignored and 12 bits can be used to define an angle of latitude and 13 bits for an angle of longitude without loss of resolution. The remaining 3 bits, referred to as A, B and C can be used to define the shape of a geographical area.

An example of the structure of an address code word is as follows, the bit numbers have been entered above the structure:

| 1 | | | 4 | 16 | | | 20 | 32 |
|---|---|---|---|---|---|---|---|---|
| 1 | 1 | 1 | 0 | Degrees Latitude (N/S) | A | B | C | Degrees Longitude (E/W) |

One advantage of this structure is that different parts of the address can be extracted with simple masking techniques in a 16 bit computer. In this structure the Degrees Latitude is a 12 bit number (first bit being a sign bit) specifying an angle north or south from the equator giving a resolution equal to 3.8 km. Angles to the south are treated as being negative and in 2's complement format, the most significant bit equals 1. The equator is all zeros, 70 degrees north is 0111 1111 1111 while 70 degrees south is 1000 0000 0000. Degrees Longitude is a 13 bit number specifying an angle west or east of the Greenwich meridian. Angles to the east will always be negative and in 2's complement the most significant bit equals 1. The resolution (east-west) improves towards the poles and for example on the 45 degree parallel is 3.45 km.

The A and BC bits are used to code an area from the point defined by the latitude and longitude angles. If more complex areas have to be defined then two or more concatenated addresses are sent. The value of the A bit determines whether the address codeword relates to the last location point in a list or is the only point, that is A=0, or whether there are other points in a list to follow, A=1.

Figure 7:
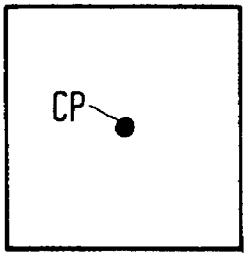
FIG. 7 illustrates a square shaped geographical area.
Figure 8:
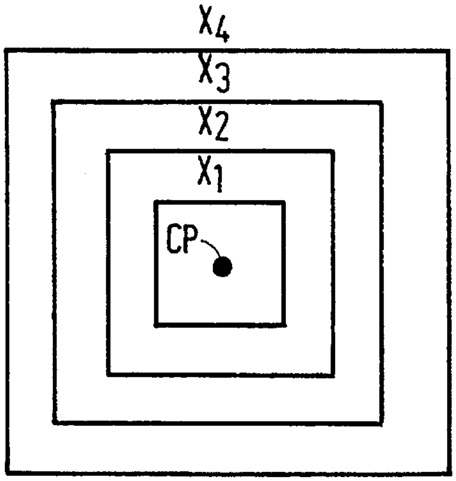
FIG. 8 illustrates how squares of different sizes may be described.

If A=0 and only one point is defined then it is treated as a description of a square centred on the point CP (see FIG. 7), the size of which is defined by the bits BC, for example, referring to FIG. 8, when

- BC=00 the square is of a side equal to $X_1$ centred on location point CP,
- BC=01 the square is of a side equal to $X_2$ centred on location point CP,
- BC=10 the square is of a side equal to $X_3$ centred on location point CP, and
- BC=11 the square is of a side equal to $X_4$ centred on location point CP.

The values of $X_n$ are defined locally but could be multiples of the minimum distance between two adjacent points on the same latitude, for example $X_2$, $X_3$ and $X_4$ can be any constant multiples of $X_1$ such as 5, 25 and 125. At 45 degrees North this would give values of $X_2$=3.45 km., $X_3$=86.3 km. and $x_4$=432 km.

The following table gives a summary of how the various shapes are defined by providing information about one or more points. The notation "x" in the B and C columns indicates that a null or padding bit is used.

Figure 9:
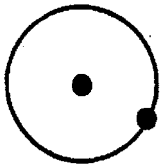
FIGS. 9–12 illustrate geographical areas having the shapes of a circle, a rectangle, a corridor and a polygon, respectively.
Figure 10:
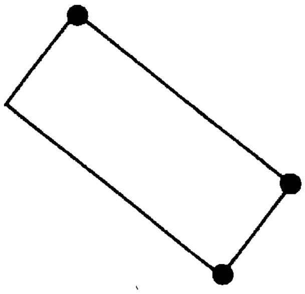
Figure 11:
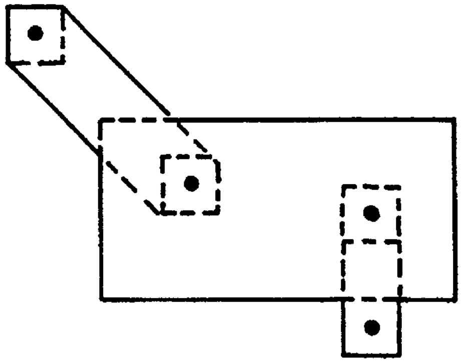
Figure 12:
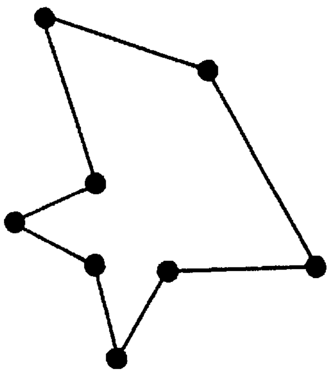

| Shape | A | B | C | Notes |
|---|---|---|---|---|
| Square (FIGS. 7 and 8) | 0 | These two bits are used to define a list of standard sizes. | | Only one point is needed. |
| Circle (FIG. 9) | 1 | 1 | 0 | First point defines centre. |
| | 0 | x | x | Second and last point. |
| Rectangle (FIG. 10) | 1 | 0 | 1 | Defines the first corner of the rectangle. |
| | 1 | x | x | Defines the second corner of the rectangle. If this second point is NOT given, then the rectangle sides run north–south, east–west. |
| | 0 | x | x | Defines the last corner of the rectangle. No more points needed. |
| Corridor (FIG. 11) (Formed by connecting together squares of defined shapes) | 1 | 1 | 1 | Defines centre of a square (size given in next address). |
| | 1 | These two bits are used to define a list of standard sizes. | | Defines centre and size of next square and the size of a square about the previously defined centre - this square and the previous square (of the same size) are connected by their outside corners. |
| | 0 | These two bits are used to define a list of standard sizes. | | Defines centre and size of last square and the size of a square about the previously defined centre - this square and the previous square (of the same size) are connected by their outside corners. |
| Polygon (Exclusive-or filled) (FIG. 12) | 1 | 0 | 0 | Defines first vertex of the polygon. |
| | 1 | x | x | Defines the next vertex of the polygon. Repeat as often as necessary. |
| | 0 | x | x | Defines the last vertex of the polygon. This point is connected back to the first point to close the polygon. |

For ease of implementation of a corridor shape all the squares are aligned north-south, east-west.

Using the disclosed method of, and system for, describing geographical areas a format for a routing address is obtained which complements the IP and enables transmission between computer terminals.

Once the location and shape of a geographical area has been described, the description may be stored in a look up table in the network control computer. Thus if subsequently another incident occurs at say the location X (FIGS. 1, 3 and 4) and the coverage areas A, B, C and D are substantially the same, the need for generating a map and overlaying it on the coverage areas of the network's base station transceivers can be avoided by simply deriving the required information from the look up table.

Another embodiment of the invention will now be described in which by sending 32 bit messages in the IP options field of the IP header rather than in an address field as described above, the need to reserve the first 4 bits for a class D code word to identify that it is class D is avoided. Consequently it is possible to code any location in the world and also to have high definition area descriptions and also to have reduced length codewords without loss of definition by defining each new geographical point relative to a preceding point.

Figure 13:
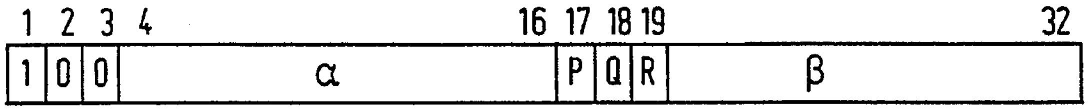
FIG. 13 illustrates an alternative code word structure.
Figure 14:
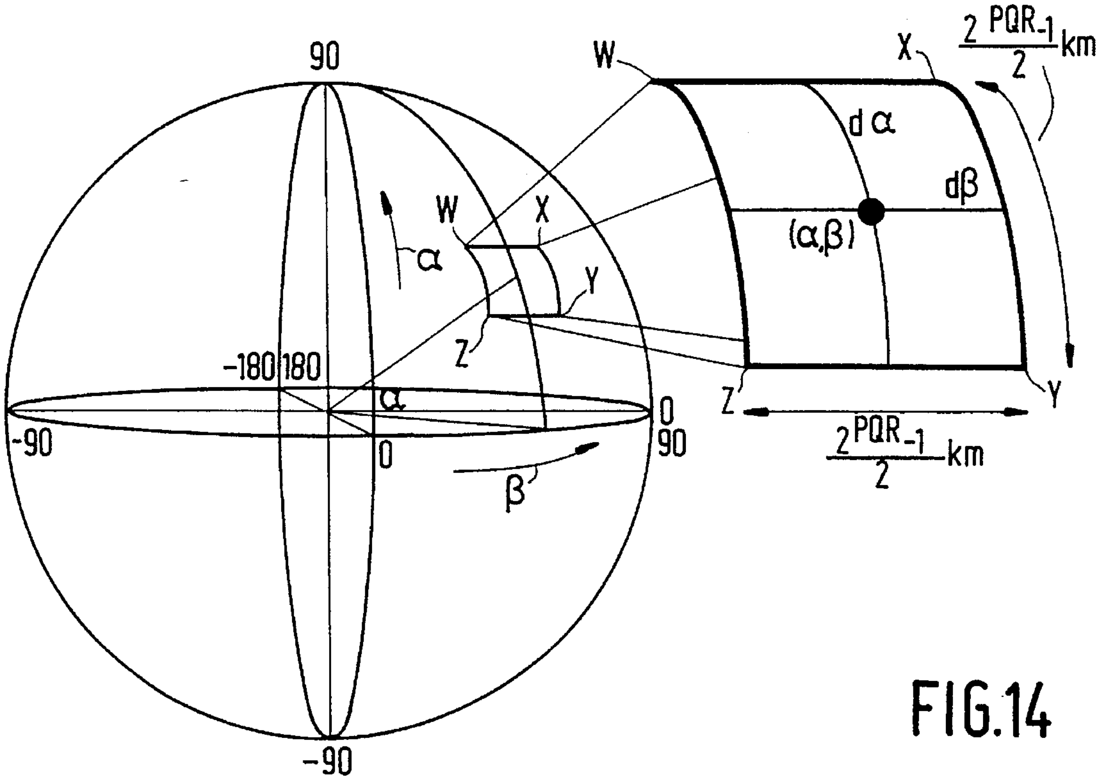
FIG. 14 is a diagram illustrating internationally reference points and an alternative method of describing a geographical area.

FIG. 13 illustrates the structure of a 32 bit code word in which bits 1, 2 and 3 each serve functions to be specified, bits 4 to 16 define the angle of latitude $\alpha$, bits 17, 18 and 19 identified by the letters PQR refer to dimensional information and in that respect correspond to BC previously defined and bits 20 to 32 define the angle of longitude B. By using 13 bits to define $\alpha$, angles of latitude in the range −90 to +90 degrees can be given. As shown in FIG. 14 the Greenwich Meridian and the equator are used as zero references for the addressing method used in this embodiment.

Referring back to FIG. 13, bit 1 has a value of binary 1 if the code word relates to defining a geographical location and a value 0 if the code word relates to a location in a look up table (to be described later), bit 2 has a value 0 for normal resolution and a value 1 for high resolution, finally bit 3 corresponds to A, previously described, and has a value of 0 if only one point or the last of two or more points is being defined and a value of 1 if there is at least one more point to be defined.

Figure 15:
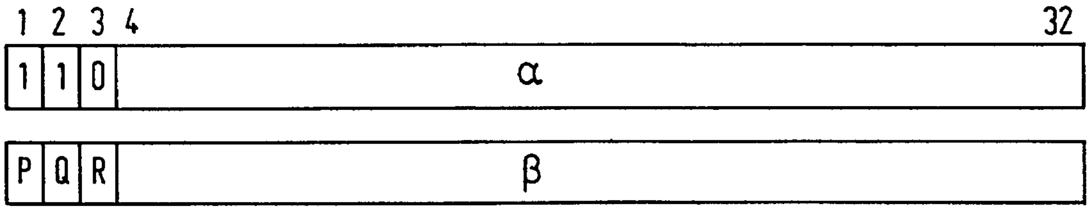
FIG. 15 illustrates two code words for describing a point with high resolution.

FIG. 15 illustrates how 2 concatenated 32 bit code words are used to define one point with high resolution. The first 3 bits of the first code word have the meanings ascribed to the first 3 bits in FIG. 13 and the bits PQR in the second code word relate to dimensions. The remaining 29 bits in each code word are used to define α and β respectively.

By way of comparison, using the code word shown in FIG. 13, the 13 bit resolution equals a resolution of 2.44 km on the equator and using the code word shown in FIG. 15, the 29 bit resolution equals a resolution of 7.5 cm on the equator.

The length of code words to describe a geographical area such as WXYZ in FIG. 14 can be reduced by specifying successive points relative to the previous point.

Figure 16:
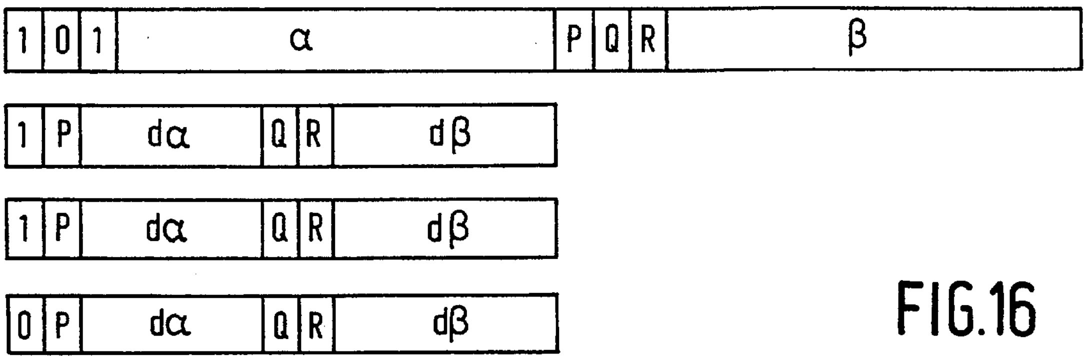
FIG. 16 comprise a series of code words giving a description of an area according to the alternative method.
Figure 17:
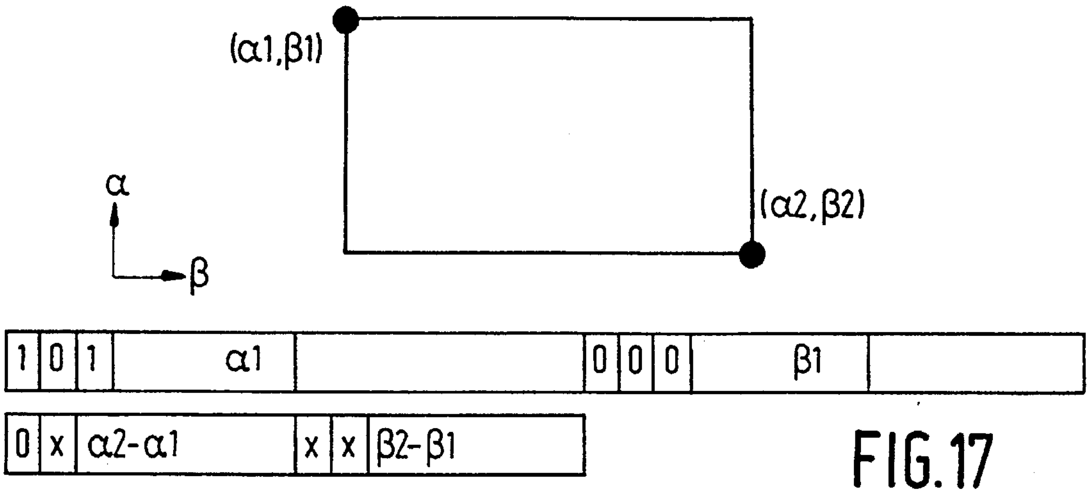
FIGS. 17–21 respectively illustrate the descriptions of a rectangle, circle, ellipse, n-polygon and an m-sided polygon.
Figure 18:
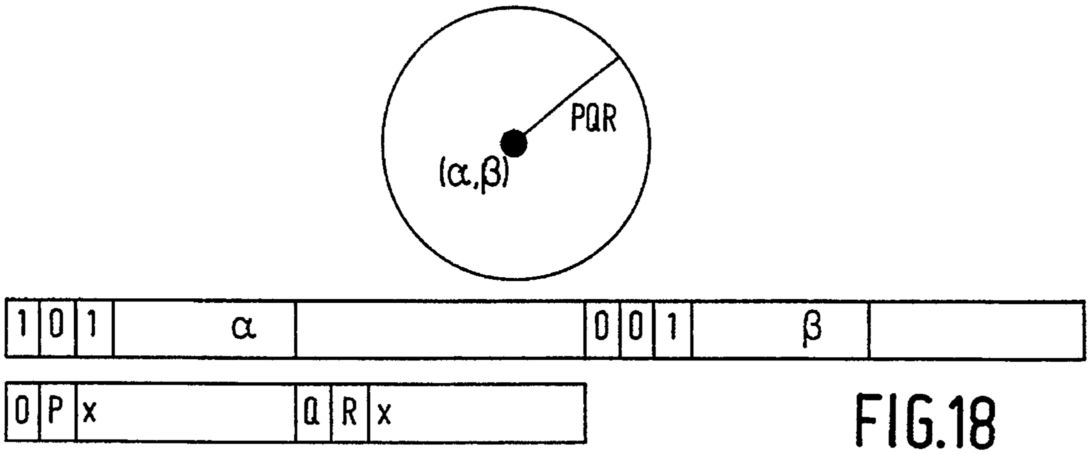
Figure 19:
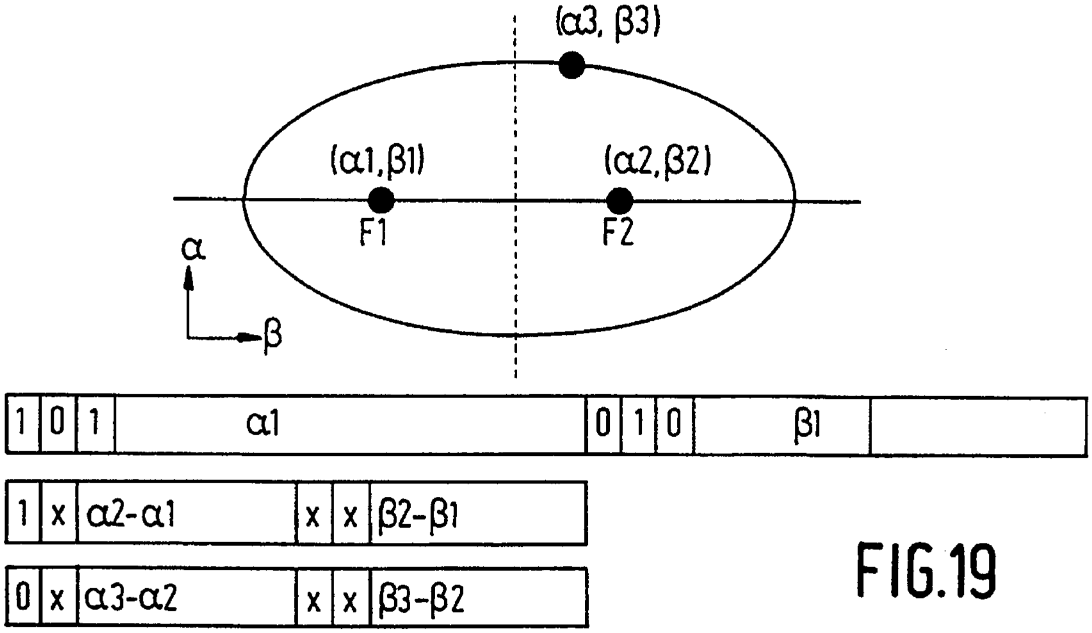
Figure 20:
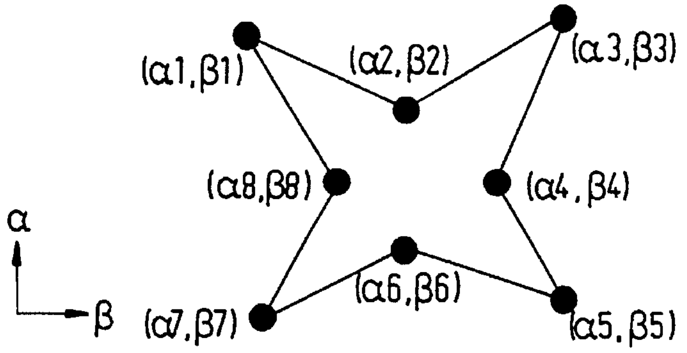

Thus referring to the enlarged version of the quadrilateral shown in FIG. 14, the specification of the central point is specified as angles α and β. However the height and breadth of the quadrilateral are specified as angles dα and dβ, which because they are relatively small can be specified using a smaller number of bits without loss of resolution. FIG. 16 illustrates an example of a geometrical shape and n (where n=4) points being specified in normal resolution. The second to fourth code words specify the angles dα and dβ. It will be noted that these latter code words are only 16 bits long and therefore the overall number of bits to specify 4 points is reduced significantly thereby giving a more compact description.

If the relative angular descriptions of dα,dβ are linear then for normal resolution 1 milli-grade corresponds to 0.11 km and in high resolution the resolution is expressed in terms of micro-grades and 1 micro-grade corresponds to 11 cm.

As an alternative the relative angular description dα,dβ may be expressed as a power of 1.3 which gives a maximal relative positioning of 3406 milli-grades (or 380 km) in normal resolution and 3406 micro-grades (or 380 m) in high resolution.

When specifying a geographical area in the second embodiment, the default shape is again a square and as in the first embodiment is specified by a single point plus an indication of its dimensions. Thus in this particular case the angles α,β specify the latitude and longitude with width/height dimensions is given by the formula $$\frac{2^{PQR}-1}{2}\ \text{km}$$

and in normal resolution PQR may have the following meanings as given in Table 1 below:

TABLE 1

| PQR-bits | Box-dimensions (km) |
|---|---|
| 000 | 0 × 0 |
| 001 | 0.5 × 0.5 |
| 010 | 1.5 × 1.5 |
| 011 | 3.5 × 3.5 |
| 100 | 7.5 × 7.5 |
| 101 | 15.5 × 15.5 |
| 110 | 31.5 × 31.5 |
| 111 | 63.5 × 63.5 |

For high resolution, each of the dimensions is reduced by a factor of 10.

For other shapes of geographical areas the bits PQR define the shape for example as given in Table 2 below:

TABLE 2

| PQR-bits of first point | Shape Description | Number of points |
|---|---|---|
| 000 | Rectangle | 2 |
| 001 | Circle | 2 |
| 010 | Ellipse | 3 |
| 011 | n-Polygon | n |
| 100 | m-Corridor | m + 1 |
| 101 | none | — |
| 110 | none | — |
| 111 | none | — |

For the sake of completeness the manner of describing a rectangle, circle, ellipse, n-polygon and m-corridor in a compact form is given in FIGS. 18 to 21. The format of the code words will be understood from the foregoing explanations. In the case of the rectangle, by aligning the sides with the lines of latitude and longitude, it can be described using two diagonally opposite points, one of which is fully defined. The letter "x" is a null or padding bit.

Figure 21:
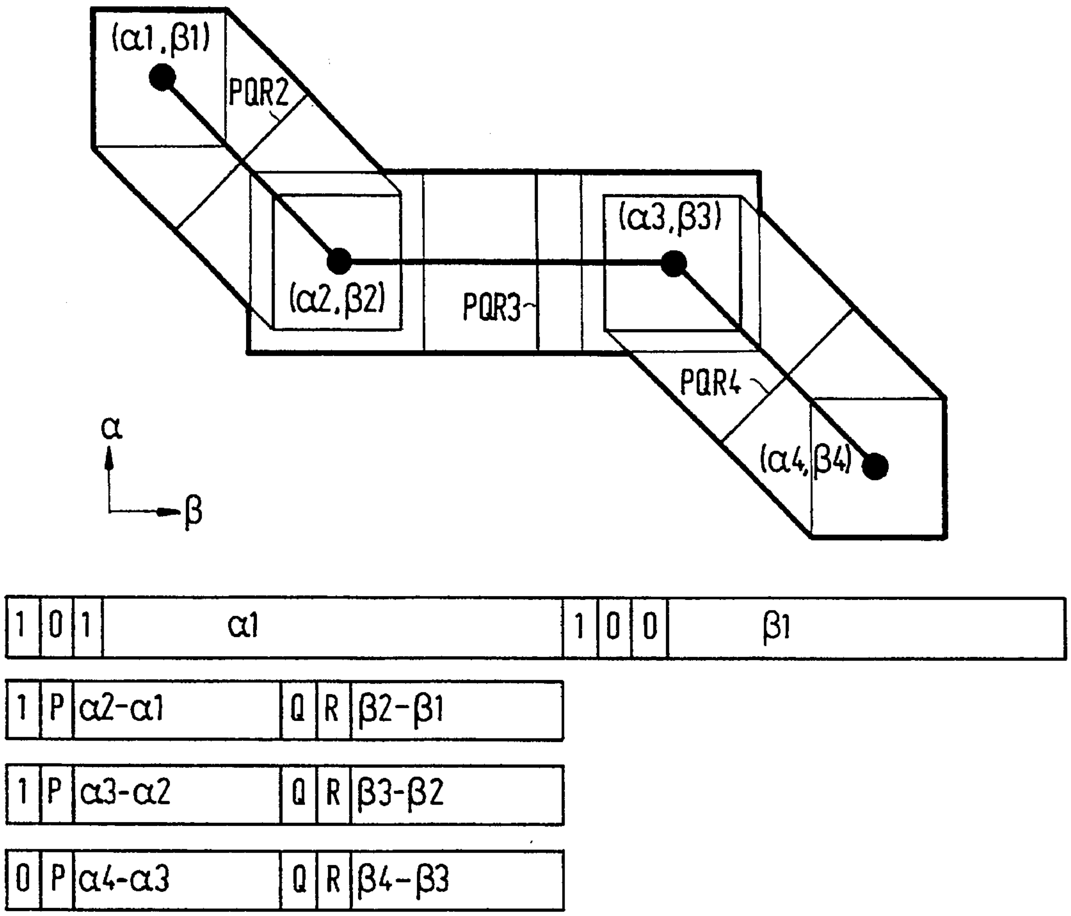

In FIG. 21 the first corridor segment is formed by the points (α1,β1) and (α2,β2). The width of the first segment is contained in the PQR-bits of the second point. The second corridor segment is formed by the points (α2,β2) and (α3,β3). The width of the second segment is contained in the PQR-bits of the third point, and so on. The corridor segment widths in kilometers are calculated as in Table 1 above.

Figure 22:
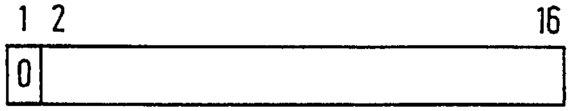
FIG. 22 illustrates the format of a code word for use with a look up table.

Once a geographical area has been described, especially a polygon or a corridor, the description can be stored in a look-up table and it is sufficient for a traffic control centre to send the relevant look up table address to a network control computer. The format of a 16 bit code word is shown in FIG. 22. The first bit of a 16 bit code word has a value 0 to indicate that a 15 bit look up table address is to follow.

The look up table method could for instance be used to describe the coverage area of a base-station cell (when known) and store it in the addressing module(s) so that messages can be sent to specific cell areas. It is also possible to describe the contour of a large city and use the number to transmit messages only in that city's area.

From reading the present disclosure, other modifications will be apparent to persons skilled in the art. Such modifications may involve other features which are already known in the design, manufacture and use of methods of, and systems for, transmitting descriptions of geographical areas over a communications network and component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

We claim:

1. A method of describing a geographical area to a communications network, comprising determining the shape of the geographical area and determining the location of at least one point lying symmetrically in the geographical area or lying on the perimeter of the geographical area, encoding the location of the at least one point as an angle of latitude and an angle of longitude and encoding the shape of the geographical area as a series of bits, and transmitting the description of the geographical area as a single code word or a plurality of concatenated code words.

2. A method of relaying road traffic information to vehicles in a predetermined geographical area, comprising determining the size and shape of the geographical area in which vehicles should receive a particular item of road traffic information, encoding details of the geographical area as angles of latitude and longitude of at least one point lying symmetrically in the geographical area or lying on the perimeter of the geographical area and as an indication of its shape, transmitting said encoded details as a single code word or concatenated code words to a control computer of a cellular radio network comprising a plurality of geographically distributed radio transmitters, determining from the received encoded details which of the radio transmitters will provide a coverage area most closely matching the geographical area and activating those radio transmitters to relay the item of road traffic information.

3. The method as claimed in claim 1, wherein encoded information relating to a particular geographical area is stored in a look up table and in that the code word comprises the address of the entry in the look up table.

4. The method as claimed in claim 1,wherein a symmetrically shaped geographical area is encoded as the angles of latitude and longitude of the centre of the area together with an indication of the relative length of one dimension of the area.

5. The method as claimed in claim 1, wherein a geographical area requiring n points to describe it, where n is an integer greater than 1, is described by the angles of latitude and longitude of each point.

6. The method as claimed in claim 1, wherein a geographical area requiring n points to describe it, where n is an integer greater than 1, is described by giving the angles of latitude and longitude of one of the n points and by indications of the angular changes in latitude and longitude between the said one of the n points and a next following point, and, if required, between the next following point and a further point, and so on.

7. The method as claimed in claim 6, wherein said indications of angular changes are expressed in the same degree of resolution as the latitude and longitude of the one of the n points.

8. The method as claimed in claim 5, wherein the latitude and longitude of the one of the n points are expressed with a high resolution in two concatenated code words.

9. A system for relaying road traffic information to vehicles in a predetermined geographical area in which radio transmitters of a cellular network are located, comprising means for determining the size and shape of the geographical area, means for encoding a description of the geographical area as the angles of latitude and longitude of at least one point lying symmetrically in the geographical area or lying on the perimeter of the geographical area and as an indication of its shape, means for relaying the description to a cellular radio network, the cellular radio network having means for storing the locations and contemporaneous coverage areas of all the transmitters in the network, means for determining from the received description which of the transmitters can collectively provide a coverage area most closely matching the geographical area described and means for generating road traffic information and for activating the relevant transmitters.

10. The system as claimed in claim 9, wherein said means for determining the size and shape of a geographical area has means for storing a map of the road network of a larger area and means for determining the shape of the geographical area in dependence of the road network within and adjacent to said area.

11. The method as claimed in claim 2, wherein encoded information relating to a particular geographical area is stored in a look up table and in that the code word comprises the address of the entry in the look up table.

12. The method as claimed in claim 2, wherein a symmetrically shaped geographical area is encoded as the angles of latitude and longitude of the center of the area together with an indication of the relative length of one dimension of the area.

13. The method as claimed in claim 2, wherein a geographical area requiring n points to describe it, where n is an integer greater than 1, is described by the angles of latitude and longitude of each point.

14. The method as claimed in claim 2, wherein a geographical area requiring n points to describe it, where n is an integer greater than 1, is described by giving the angles of latitude and longitude of one of the n points and by indications of the angular changes in latitude and longitude between the said one of the n points and a next following point, and, if required, between the next following point and a further point, and so on.

15. The method as claimed in claim 3, wherein a symmetrically shaped geographical area is encoded as the angles of latitude and longitude of the center of the area together with an indication of the relative length of one dimension of the area.

16. The method as claimed in claim 3, wherein a geographical area requiring n points to describe it, where n is an integer greater than 1, is described by the angles of latitude and longitude of each point.

17. The method as claimed in claim 3, wherein a geographical area requiring n points to describe it, where n is an integer greater than 1, is described by giving the angles of latitude and longitude of one of the n points and by indications of the angular changes in latitude and longitude between the said one of the n points and a next following point, and, if required, between the next following point and a further point, and so on.

18. The method as claimed in claim 11, wherein a symmetrically shaped geographical area is encoded as the angles of latitude and longitude of the center of the area together with an indication of the relative length of one dimension of the area.

19. The method as claimed in claim 11, wherein a geographical area requiring n points to describe it, where n is an integer greater than 1, is described by the angles of latitude and longitude of each point.

20. The method as claimed in claim 2, wherein a geographical area requiring n points to describe it, where n is an integer greater than 1, is described by giving the angles of latitude and longitude of one of the n points and by indications of the angular changes in latitude and longitude between the said one of the n points and a next following point, and, if required, between the next following point and a further point, and so on.

21. The method as claimed in claim 14, wherein said indications of angular changes are expressed in the same degree of resolution as the latitude and longitude of the one of the n points.

22. The method as claimed in claim 6, wherein the latitude and longitude of the one of the n points are expressed with a high resolution in two concatenated code words.

23. The method as claimed in claim 13, wherein the latitude and longitude of the one of the n points are expressed with a high resolution in two concatenated code words.

24. The method as claimed in claim 14, wherein the latitude and longitude of the one of the n points are expressed with a high resolution in two concatenated code words.

* * * * *